United States Patent Office 3,356,672
Patented Dec. 5, 1967

3,356,672
DYES CONTAINING TRIMELLITHAMIDE GROUPS
Ernst Schefczik, Ludwigshafen (Rhine), Germany, assignor to Badische Anilin- & Soda-Fabrik Aktiengesellschaft, Ludwigshafen (Rhine), Germany
No Drawing. Filed Feb. 16, 1965, Ser. No. 433,170
Claims priority, application Germany, Feb. 25, 1964, B 75,581; Dec. 5, 1964, B 79,628
5 Claims. (Cl. 260—152)

ABSTRACT OF THE DISCLOSURE

Anthraquinone pigment dyes having characteristic trimellithamide groups as exemplified by the dyestuff of the formula

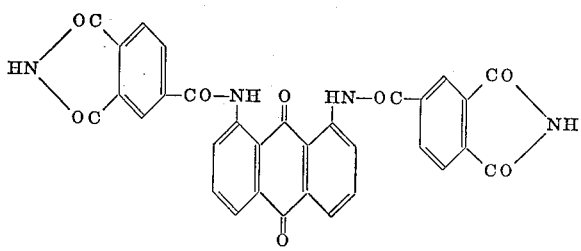

These antharquinone pigments are useful in lacquers, varnishes, printing inks, glue paints, pastes or the like as well as for coloring natural or synthetic polymers or for mass-dyeing paper or adding color to inorganic materials such as cement, thereby imparting high light fastness and good solvent fastness.

---

This invention relates to new dyes containing trimellithamide groups and to a process for their manufacture.
The new valuable dyes have the general formula

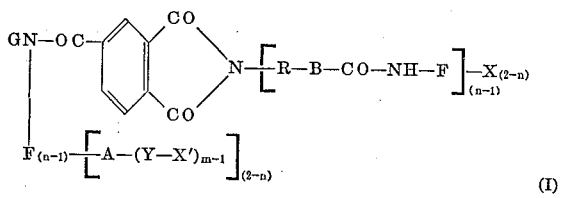

where

F denotes the radical of an organic dye which is free from sulfonic acid groups,
R denotes an alkylene group or an arylene group,
B denotes a single bond or the bridging group

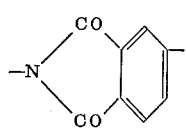

which is attached to the carbamoyl group

—CO—NH—F

at its benzene ring,
G denotes a hydrogen atom or a low molecular weight alkyl radical, the radicals
X denote hydrogen atoms, methyl groups or aromatic or heterocyclic radicals,
A denotes the radical of an anthraquinone dye which is free from sulfonic acid groups, Y denotes the bridging group

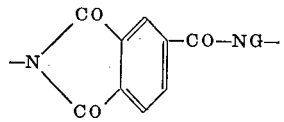

which is attached to the dye radical A at its carbamoyl group,
m denotes one of the numbers 1, 2 and 3, and
n denotes one of the numbers 1 and 2.

Since these dyes are insoluble in water and organic solvents and have very good fastness properties, they are eminently suitable as pigment dyes.
Examples of dyes having the general Formula I are compounds having the general formula

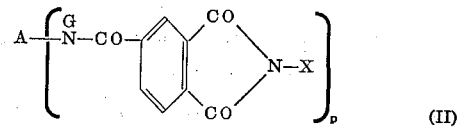

where A denotes the radical of an anthraquinone dye which is free from sulfonic acid groups, G denotes a hydrogen atom or a low molecular weight alkyl radical, X denotes a hydrogen atom, a methyl group or an aromatic or heterocyclic radical, and $p$ denotes one of the numbers 1, 2, 3 and 4, the radicals X being identical or different in case $p$ is greater than 1.
The new anthraquinone dyes of the Formula II may be derived from anthraquinone itself or from anthraquinone derivatives having a higher degree of condensation, e.g. those of the benzanthrone, dibenzanthrone, isodibenzanthrone, pyrazolanthrone, anthrapyrimidine, anthraquinacridone, pyranthrone, indanthrone, flavanthrone and perylenetetracarboximide series. They are free from sulfonic acid groups, but their dye radical A may bear substituents, such as hydroxyl groups, halogen atoms, alkyl groups, aryl groups, alkoxy groups and acylamino groups, which in their turn may be substituted.
The new dyes having the Formula II in which G stands for a hydrogen atom and the carbamoyl bridge is attached direct to the aromatic nucleus of the radical A, are of particular technical interest. Examples of such dyes, if A denotes an anthraquinone radical, are compounds having the general formula

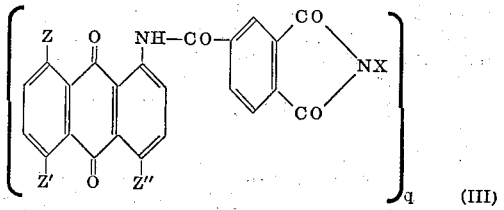

where $q$ denotes the number 1 or 2, one radical Z denotes a hydrogen atom, a hydroxyl group, an acylamino group, a radical having the general formula

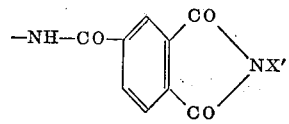

or, if $q$ stands for 2, denotes toegther with the second radical Z in the same position a radical having the general formula

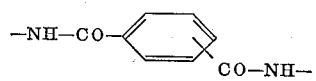

the other radicals Z denote hydrogen atoms or hydroxyl groups and the radicals X denote hydrogen atoms, methyl groups, aromatic or heterocyclic radicals, but preferably hydrogen atoms, methyl groups or p-phenylazophenyl groups.

Further examples of dyes of the general Formula I are compounds having the formula

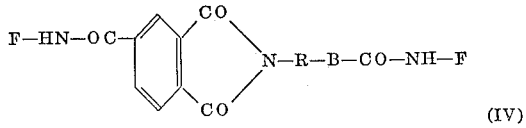
(IV)

where F denotes the radical of an organic dye which is free from sulfonic acid groups, R denotes an alkylene group or an arylene group and B denotes a single bond or the bridging group

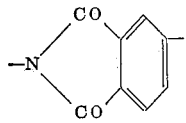

whose benzene ring is attached to the carbamoyl group —CO—NH—F. The radical R may be an alkylene group containing up to 8 carbon atoms, such as a methylene group, or an alkylene group consisting of 2, 3, 4, 6 or 8 methylene groups. R may also denote an arylene group, such as a 1,4-phenylene or 1,3-phenylene group, or an arylene group having one of the following formulas:

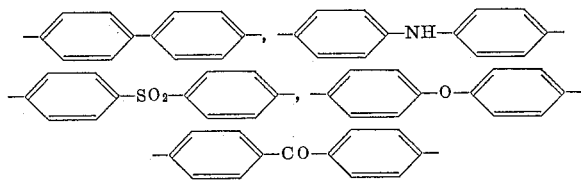

and

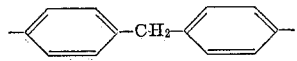

The new dyes of the general Formula IV may be azo or anthraquinone dyes. They are free from sulfonic acid groups, but their dye radical F may bear substituents, such as hydroxyl groups, halogen atoms, nitro groups, alkyl groups, aryl groups, alkoxy groups, aryloxy groups and acylamino groups, which in their turn may be substituted. The anthraquinone dyes used as starting materials may be derived from anthraquinone itself or from anthraquinone derivatives having a higher degree of condensation, e.g. those of the benzanthrone, dibenzanthrone, isodibenzanthrone, pyrazolanthrone, anthrapyrimidine, anthraquinacridone, pyranthrone, indanthrone, flavanthrone and perylenetetracarboximide series. The azo dyes used as starting materials may be monoazo dyes or disazo dyes.

The new dyes having the general Formula II in which the carbamoyl groups —CO—NH— are attached direct to an aromatic nucleus of the dye radical F, are of particular technical interest.

The new dyes having the general Formula II may be obtained by reacting anthraquinone dyes which have at least one acylatable amino group with acid halides having the general formula

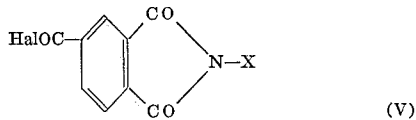
(V)

where Hal denotes a chlorine or bromine atom and X has the meaning given above, by methods known per se, and acylating any unreacted acylatable amino groups with other aromatic acid halides in a manner known per se.

The anthraquinone dyes required as starting materials for the manufacture of the new dyes having the general Formula II contain at least one acylatable amino group, e.g. a primary amino group, or an amino group bearing as a substituent a low molecular weight alkyl radical, e.g. an alkyl radical having 1 to 4 carbon atoms. Examples of such compounds are: 1-aminoanthraquinone, 1 - amino - 5 - benzoylaminoanthraquinone, 1,5 - diaminoanthraquinone, 1,4 - diaminoanthraquinone, 1,8-diaminoanthraquinone, 1,5 - diamino - 4,8 - dihydroxyanthraquinone, 1 - amino - 4 - benzoylaminoanthraquinone, 1-aminobenzanthrone, monoaminopyranthrone, diaminopyranthrone, tetraminopyranthrone, 4 - aminoanthraquinone - 2,1(N) - 1',2'(N) - benzacridone, 4-amino-3',5' - dichloroanthraquinone - 2,1(N) - 1',2'(N) - benzacridone, 1,4,5 - triaminoanthraquinone, 1,4,5,8 - tetraminoanthraquinone, 1,5 - diamino - 4,8 - bis - (methylamino) - anthraquinone, 1 - amino - 4 - (p - aminobenzoylamino) - anthraquinone, 1,8 - bis - (p - aminobenzoylamino) - anthraquinone and 1,5 - bis - (p - aminophenylmercapto)-anthraquinone.

Some of the acid halides of the general Formula V, which are required for the manufacture of the new dyes, are new compounds. They are obtained from the corresponding trimellithamides by methods known per se, e.g. by reaction with thionyl chloride, thionyl bromide or phosgene. Acid chlorides are preferred. Examples of acid chlorides are listed in the following table:

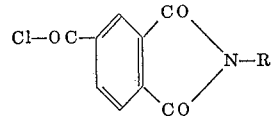

| R | Melting point in °C. |
|---|---|
| —H | 155–156 |
| —CH₃ | 140 |
| —⟨phenyl⟩ | 298–302 |
| —⟨phenyl⟩—Cl | 281–284 |
| —⟨phenyl⟩—Br | 165–170 |
| —⟨phenyl⟩—NO₂ | 262–266 |
| —⟨phenyl⟩—N=N—⟨phenyl⟩ | 241 |
| —⟨phenyl⟩—N=N—⟨phenyl⟩—NO₂ | 245–246 |
| —⟨N⟩SO₂ | 160–161 |

The said anthraquinone derivatives are reacted with the acid halides, one hydrogen atom of the acylatable amino group being replaced by the acyl radical of the acid halide. The procedure may be for example to use at least a stoichiometric amount of an acid halide with reference to the acylatable amino groups in the anthraquinone derivative to be reached. If the anthraquinone derivative to be reacted contains two or more acylatable amino groups, it is also possible to react the various amino groups with different acid halides of the said type. Finally, the new dyes may also be obtained by reacting only one amino group of the said anthraquinone derivatives which contain several, e.g. two, acylatable amino groups, with the said acid halides in the manner indicated, and acylating the unreacted amino group with other aromatic acid halides. Examples of suitable compounds are compounds having one or two acid halide groups, such as benzoyl chloride, benzoyl bromide, terephthalic dichloride, phthalic dichloride, diphenyl-4-carboxylic chloride, phenylbenzthiazolcarboxylic chloride having the formula

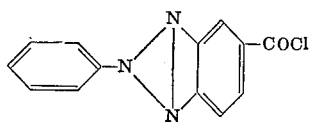

thiazolanthrone - 2 - carboxylic chloride, Bz - 1 - benzanthronecarboxylic chloride, benzophenone-4,4'-dicarboxylic dichloride, diphenylsulfone-4,4'-dicarboxylic dichloride, azobenzene-4,4'-dicarboxylic dichloride, 2,5-diphenyl-oxdiazoledicarboxylic dichloride, 2,5 - diphenyl-thiadiazoledicarboxylic dichloride, tetrachloroterephthalic dichloride and anthraquinone-2,6-dicarboxylic dichloride. These acid halides are used in about stoichiometric amounts with reference to the number of amino and acid halide groups, so that if bivalent acid halides are used the acyl radical of the acid halide is replaced by two identical A—NG radicals.

Reaction of the said anthraquinone derivatives with the acid halides is advantageously carried out in a solvent at temperatures of from 0 to 260° C. Examples of suitable solvents are: xylene, monochlorobenzene, dichlorobenzene, trichlorobenzene, nitrobenzene, naphthalene, dimethyl formamide, N-methylpyrrolidone, and diphenyl ether.

The new dyes having the general Formula IV may for example be obtained by reacting the halogen of acid halides having the general formula

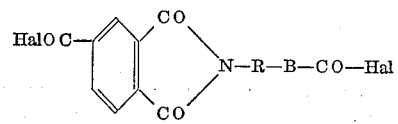

(VI)

where Hal denotes a chlorine atom or a bromine atom and R and B have the meanings given above, with organic dyes containing a primary amino group by methods known per se.

The dyes required as starting materials for the manufacture of the new dyes having the general Formula IV contain a primary amino group but no sulfonic acid groups. Examples of such compounds are: 4-amino-4'-nitroazobenzene, 4-amino-2'-hydroxy - 5' - methylazobenzene, 1-aminoanthraquinone, 1-amino-5-benzoylaminoanthraquinone, 1-amino-4-benzoylaminoanthraquinone, 1-amino-8-benzoylaminoanthraquinone, 4-aminoanthrapyrrimidine - (1,9), 1-amino - 4 - hydroxyanthraquinone, 1-amino-5-benzoylamino - 4,8 - dihydroxyanthraquinone, 1-amino-4-phenylmercaptoanthraquinone. Bz-1-aminobenzanthrone, 2-aminobenzanthrone and the compounds

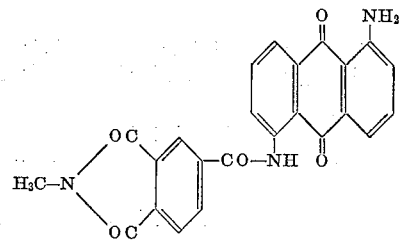

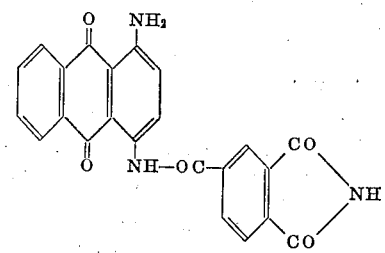

and

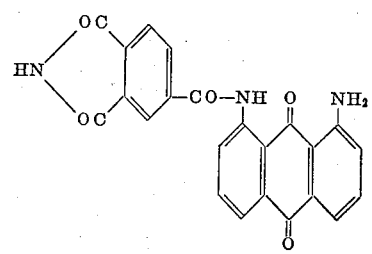

In the process according to this invention the said dyes containing a primary amino group are reacted with acid halides having the general Formula VI.

Examples of such acid halides are:

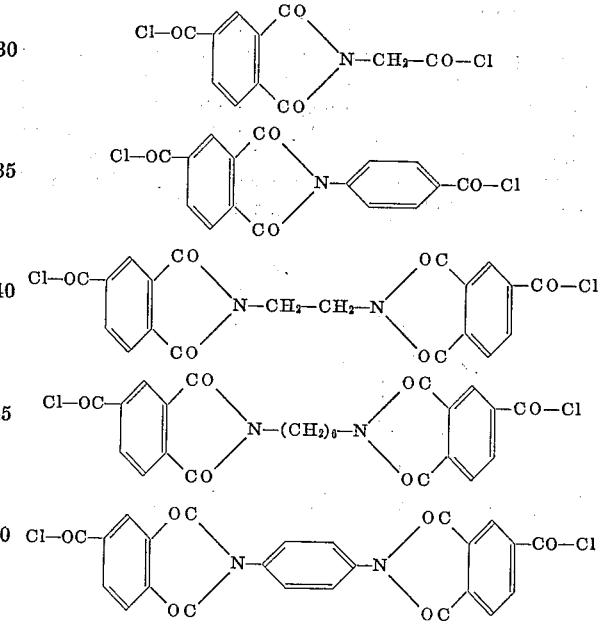

and

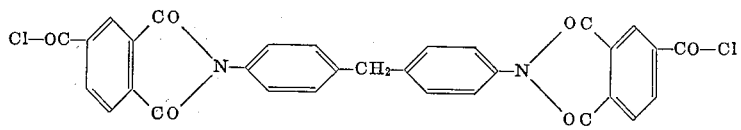

Acid halides having the general Formula VI may for example be obtained from the corresponding trimellithimides by methods known per se, e.g. by reaction with thionyl chloride, thionyl bromide or phosgene. Acid chlorides are preferred.

The said initial dyes containing amino groups are reacted with acid halides having the general Formula VI, one hydrogen atom of the amino group being replaced by an acyl radical of the acid halide. There is used at least twice the molar amount of the initial dye with reference to one mole of acid halide. The reaction is advantageously carried out in a solvent at temperatures of 70 to 260° C., preferably 100 to 220° C. There are employed such solvents as do not enter into undesirable reactions with the reactants under the reaction conditions. Examples of suitable solvents are: nitrobenzene, naphthalene, diphenyl oxide, diphenylene oxide, trichlorobenzene and N-methylpyrrolidone.

The new dyes separate from the reaction mixture and may be isolated from it by suction filtering while it is still hot or after it has been allowed to cool to room temperature. The dyes are purified by washing or extracting, dried and, if desired, finely ground in conventional manner.

The new pigment dyes have outstanding fastness properties, e.g. high light fastness and good solvent fastness. They may be used in all types of pastes, flush colors, formulations, printing inks, glue paints, as binder colors, and for coloring lacquers and varnishes. They may also be incorporated in synthetic or natural macromolecular substances, such as polyvinyl chloride, polystyrene, polyamide, polyethylene, polypropylene, polyesters, phenoplasts, aminoplasts, and rubber. The new pigments may also be used for mass-dyeing fibers of cellulose acetate, polyacrylonitrile, polyester, polyurethane and polyvinyl chloride. They are also suitable for mass-dyeing paper or for coloring inorganic substances, e.g. cement.

The invention is further illustrated by the following examples, in which parts are by weight. Parts by weight bear the same relation to parts by volume as the kilogram to the liter.

EXAMPLE 1

111.5 parts of 1-aminoanthraquinone and 110 parts of phthalimide-4-carboxylic chloride are boiled in 1200 parts by volume of xylene for two hours with stirring. Hydrogen chloride escapes through the condenser. The reaction mixture is filtered off with suction at 50° C. and the residue is washed with benzene and dried. 196 parts of a reddish yellow dye having the formula

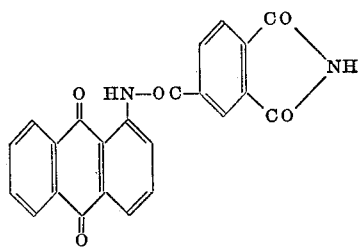

is obtained. The compound has a melting point of 305° C., and is particularly suitable for dyeing polystyrene and for spin-dyeing polyamides.

EXAMPLE 2

171 parts of 1-amino-5-benzoylaminoanthraquinone and 110 parts of phthalimide-4-carboxylic chloride are introduced into 1500 parts by volume of chlorobenzene. The mixture is boiled for two hours with stirring. After filtration by suction at 75° C., washing and drying, 252 parts of a dye having formula

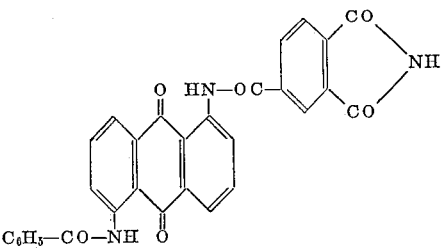

is obtained which dyes lacquers reddish yellow shades having excellent light fastness.

EXAMPLE 3

(a) 119 parts of 1,5-diaminoanthraquinone is dissolved in 800 parts by volume of N-methylpyrrolidone. Then a solution of 105 parts of phthalimide-4-carboxylic chloride in 300 parts by volume of N-methylpyrrolidone is dripped in at 20 to 25° C. in the course of two hours with stirring. After being allowed to stand for twenty hours the reaction mixture has solidified to form a crystal slurry. It is diluted with the same amount of alcohol and filtered off with suction. The residue is washed with alcohol and dried. 191 parts of a red compound having the formula

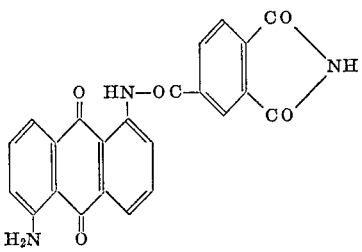

is obtained whose melting point is above 360° C.

(b) 82.2 parts of the compound obtained according to (a) is introduced into 1000 parts by volume of nitrobenzene. The mixture is brought to the boil, and 20 parts of terephthalic dichloride in 200 parts of nitrobenzene is dripped in in the course of one hour. The mixture is boiled for another eight hours and filtered off with suction at 100° C. The filter cake is extracted in a heated extractor with dimethyl formamide until the extractant runs away colorless. After washing with alcohol and drying, 91 parts of a dye having the formula

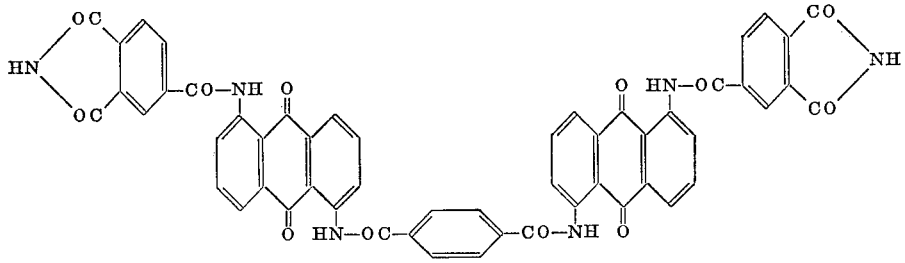

is obtained. The compound does not melt below 450° C. and gives reddish yellow shades having excellent fastness properties.

EXAMPLE 4

119 parts of 1,8-diaminoanthraquinone is dissolved in 2,500 parts by volume of nitrobenzene. 215 parts of phthalimide-4-carboxylic chloride is introduced at 60° C.

The whole is stirred for three hours at 150° C., allowed to cool to 75° C. and filtered with suction. The filter cake is extracted in a heated extractor with a mixture of glacial acetic acid and dimethyl formamide in the ratio 2:1. After washing and drying, 266 parts of a dye having the formula

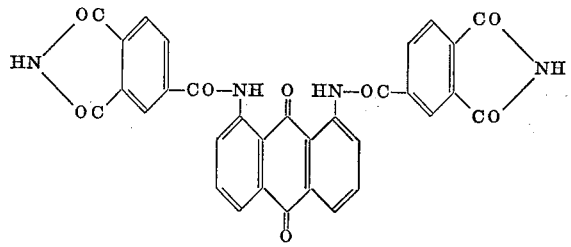

is obtained. The compound does not melt below 400° C. and dyes lacquers brilliant reddish yellow shades having outstanding light fastness.

EXAMPLE 5

49 parts of Bz-1-aminobenzanthrone and 60 parts of N-phenylphthalimide-4-carboxylic chloride are stirred in 800 parts by volume of trichlorobenzene for two hours at 200° C. The reaction mixture is allowed to cool to 40° C. and filtered with suction. The filter cake is boiled with glacial acetic acid several times. After washing with alcohol and drying, 91 parts of a dye having the formula

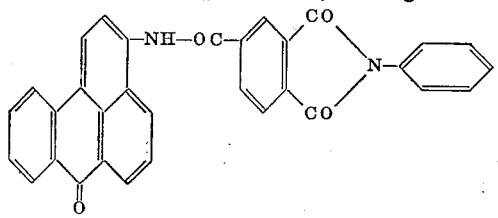

is obtained. The compound dyes polystyrene and polyamides (by spin-drying) greenish yellow shades.

EXAMPLE 6

42 parts of monoaminopyranthrone and 22 parts of phthalimide-4-carboxylic chloride are boiled in 1,500 parts by volume of nitrobenzene for eight hours. The reaction mixture is filtered with suction and the filter cake is extracted with dimethylformamide. After washing and drying 58 parts of a dye having the formula

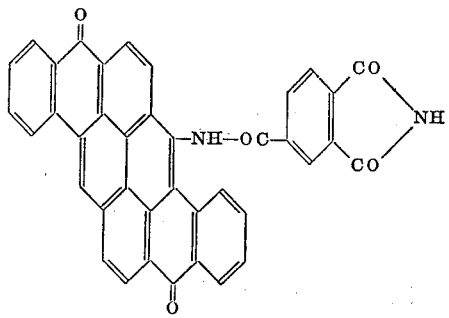

is obtained which dyes lacquers orange red shades having very good fastness properties.

EXAMPLE 7

119 parts of 1,5-diaminoanthraquinone is dissolved in 1,500 parts by volume of nitrobenzene. A solution of 105.2 parts of phthalimide-4-carboxylic chloride in 1,000 parts by volume of nitrobenzene is dripped in at 150° C. and the whole is stirred for two hours at the same temperature. Then a solution of 200 parts of N-(p-phenylazo)-phenylphthalimide-4-carboxylic chloride in 2,000 parts by volume of nitrobenzene is dripped in. The whole is boiled for four hours with stirring and filtered with suction at 80° C., and the filter cake is extracted with hot dimethylformamide. After washing and drying, 353 parts of a dye having the formula

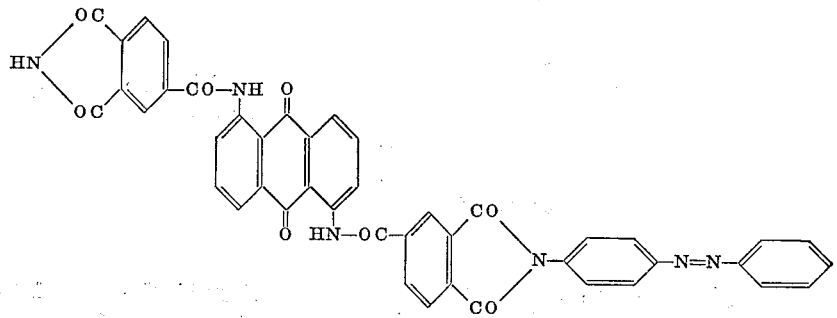

is obtained which dyes lacquers brilliant reddish yellow shades having outstanding fastness properties.

The dyes listed in the following table are obtained from the components according to Examples 1 to 7, the reaction being carired out under the conditions indicated in the table. The new dyes have the shades indicated in the table.

| Example | Dye 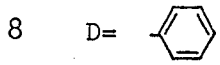 | Solvent | Reaction temperature, °C. | Reaction period, hours | Shade |
|---|---|---|---|---|---|
| 8 | D= 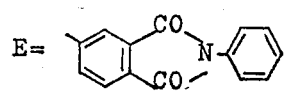 E= | xylene | 140 | 4 | reddish yellow |

| Example | Dye (D-OC-NH—anthraquinone—HN-CO-E) | Solvent | Reaction temperature, °C. | Reaction period, hours | Shade |
|---|---|---|---|---|---|
| 9 | D= phenyl; E= 4-methylphthalimido-N-(4-bromophenyl) | chlorobenzene | 130 | 2 | reddish yellow |
| 10 | D= phenyl; E= 4-methylphthalimido-N-(4-nitrophenyl) | dichlorobenzene | 175 | 1 | " |
| 11 | D= phenyl; E= 4-methylphthalimido-N-(4-phenylazophenyl) | trichlorobenzene | 210 | 2 | " |
| 12 | D= phenyl; E= 4-methylphthalimido-N-[4-(4-nitrophenylazo)phenyl] | nitrobenzene | 170 | 4 | " |
| 13 | D= phenyl; E= 4-methylphthalimido-N-(SO$_2$-morpholino) | dichlorobenzene | 150 | 4 | " |
| 14 | D=E= 4-methylphthalimide (NH) | N-methylpyrrolidone | 190 | 4 | yellow |
| 15 | D=E= 4-methyl-N-methylphthalimide | nitrobenzene | 200 | 2 | " |
| 16 | D=E= 4-methyl-N-phenylphthalimide | nitrobenzene | 190 | 1 | " |
| 17 | D=E= 4-methyl-N-(4-phenylazophenyl)phthalimide | naphthalene | 200 | 6 | " |

| Example | Dye 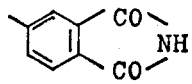 | Solvent | Reaction temperature, °C. | Reaction period, hours | Shade |
|---|---|---|---|---|---|
| 18 | D= 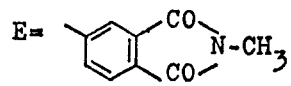 E= 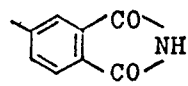 | nitrobenzene | 200 | 2 | yellow |
| 19 | D= 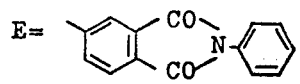 E= 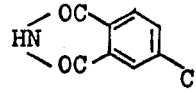 | nitrobenzene | 200 | 2 | reddish yellow |
| Example | Dye | Solvent | Reaction temperature, °C. | Reaction period, hours | Shade |
|---|---|---|---|---|---|
| 20 | 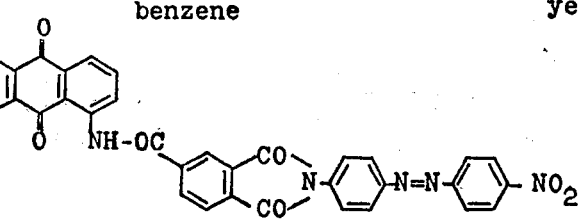 | nitrobenzene | 200 | 3 | reddish yellow |
| 21 | 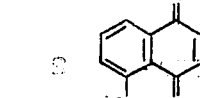 | nitrobenzene | 200 | 6 | " |
| 22a | 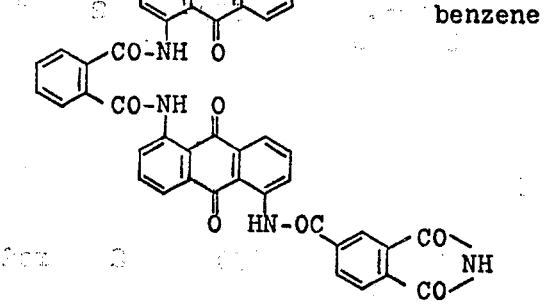 | N-methyl-pyrrolidone | 25 | 16 | |

| Example | Dye | Solvent | Reaction temperature, °C. | Reaction period, hours | Shade |
|---|---|---|---|---|---|
| 22b | 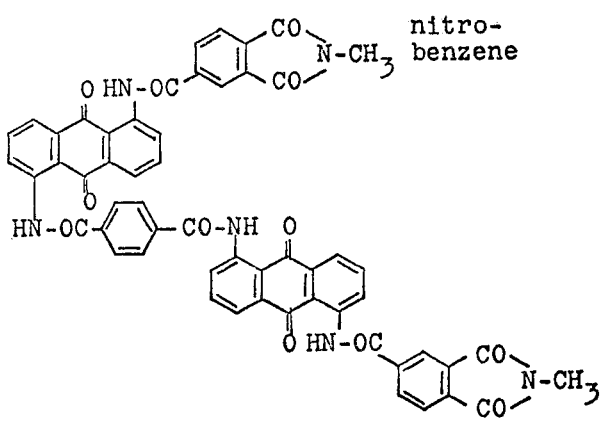 | nitrobenzene | 200 | 8 | reddish yellow |
| 23 | 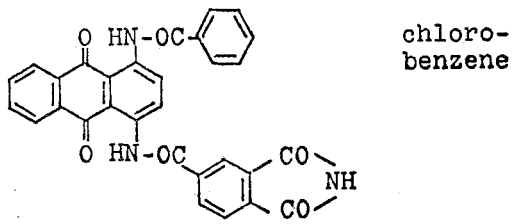 | chlorobenzene | 130 | 1 | red |
| 24 | 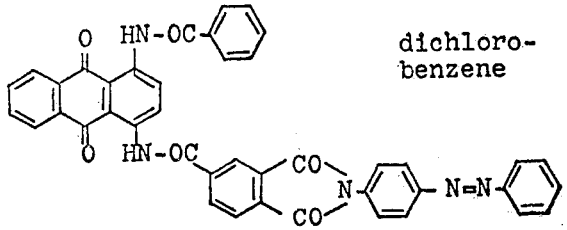 | dichlorobenzene | 170 | 2 | " |
| 25 | 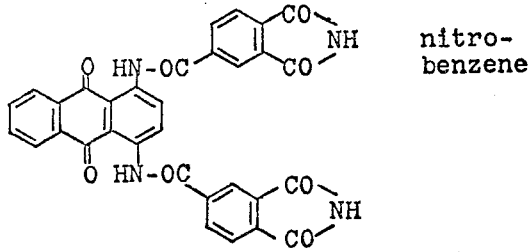 | nitrobenzene | 150 | 2 | " |
| 26 | 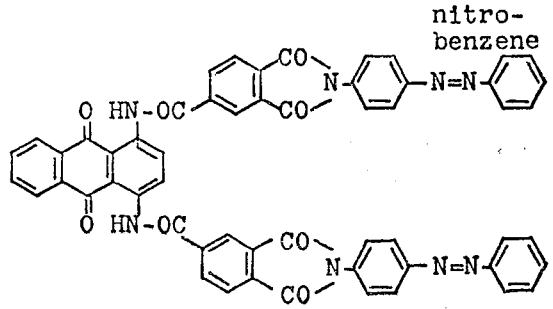 | nitrobenzene | 200 | 2 | red |

| Example | Dye | Solvent | Reaction temperature, °C. | Reaction period, hours | Shade |
|---|---|---|---|---|---|
| 27a | 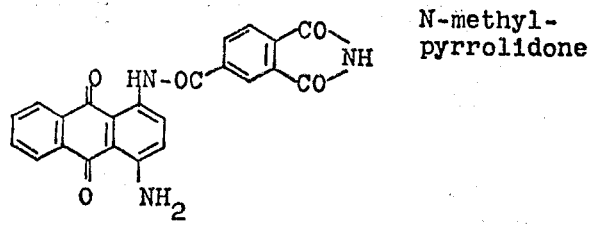 | N-methyl-pyrrolidone | 25 | 10 | |
| 27b | 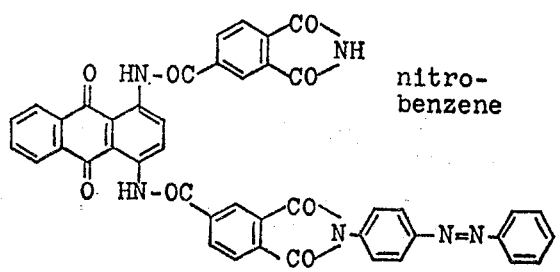 | nitro-benzene | 200 | 4 | red |
| 28 | 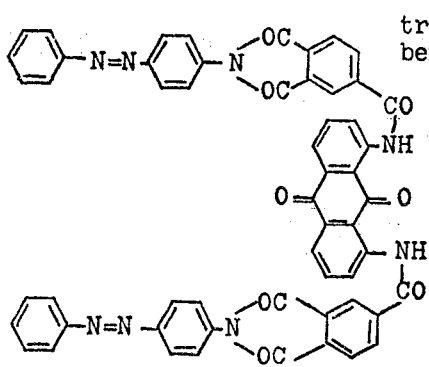 | trichloro-benzene | 175 | 2 | reddish yellow |
| 29a | 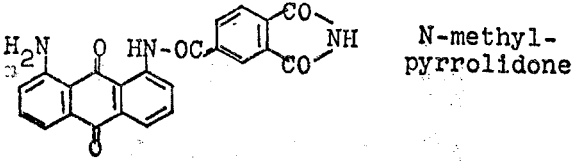 | N-methyl-pyrrolidone | 20 | 10 | |
| 29b | 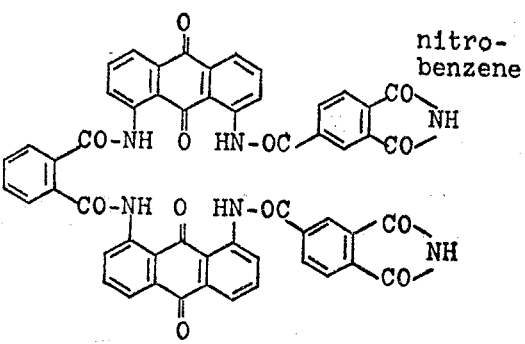 | nitro-benzene | 200 | 2 | yellow |

| Example | Dye | Solvent | Reaction temperature, °C. | Reaction period, hours | Shade |
|---|---|---|---|---|---|
| 29c | 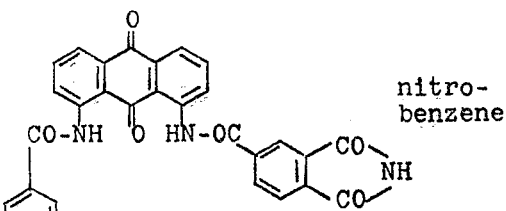 | nitrobenzene | 200 | 3 | yellow |
| 30a | 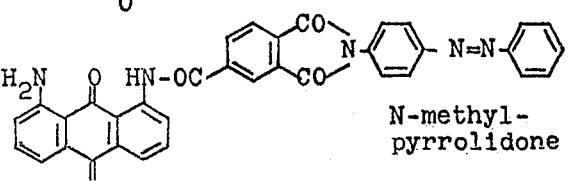 | N-methyl-pyrrolidone | 20 | 12 | " |
| 30b | 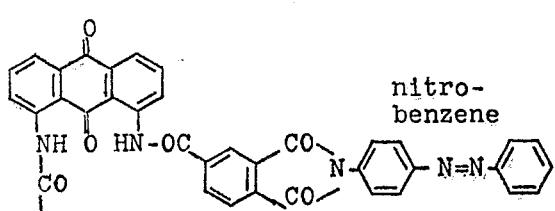 | nitrobenzene | 200 | 4 | " |
| 31 | 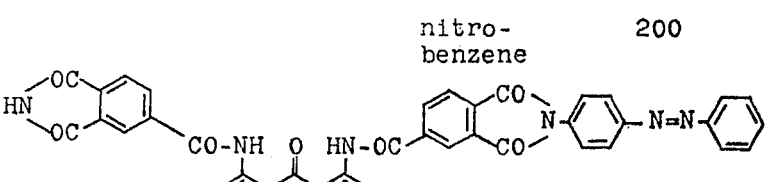 | nitrobenzene | 200 | 2 | " |
| 32 | 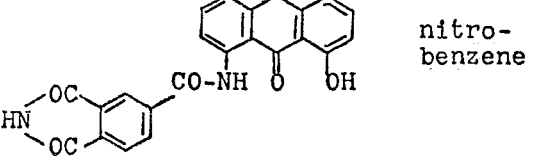 | nitrobenzene | 180 | 2 | reddish violet |

| Example | Dye | Solvent | Reaction temperature, °C. | Reaction period, hours | Shade |
|---|---|---|---|---|---|
| 33 | 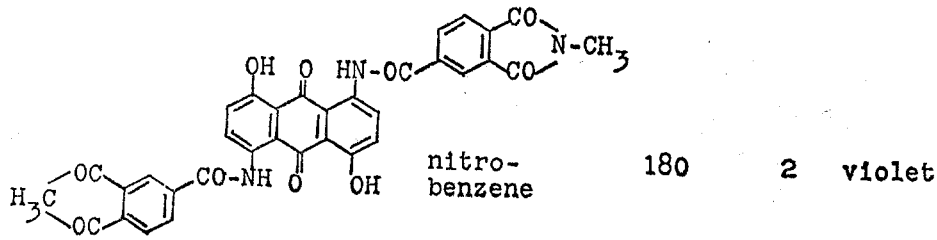 | nitrobenzene | 180 | 2 | violet |
| 34 | 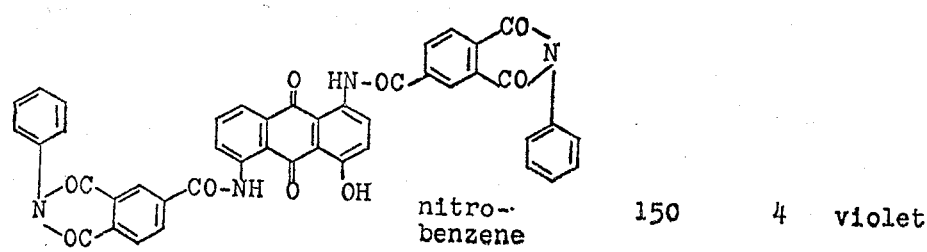 | nitrobenzene | 150 | 4 | violet |
| 35a | 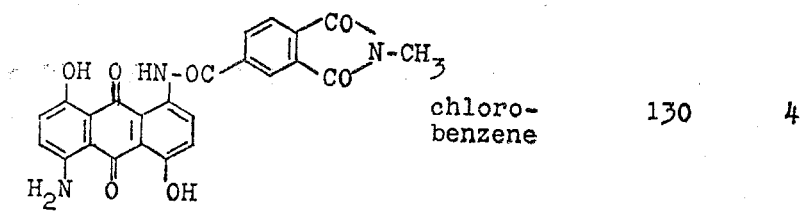 | chlorobenzene | 130 | 4 | |
| 35b | 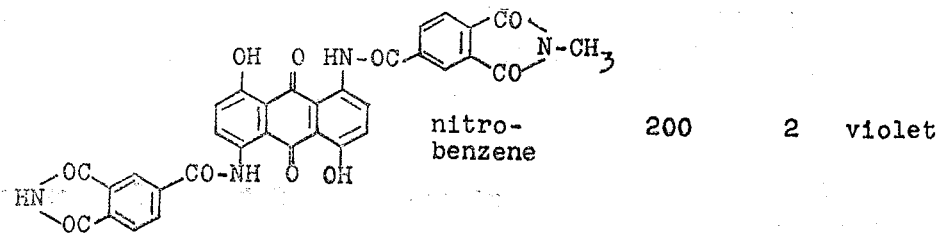 | nitrobenzene | 200 | 2 | violet |
| 35c | 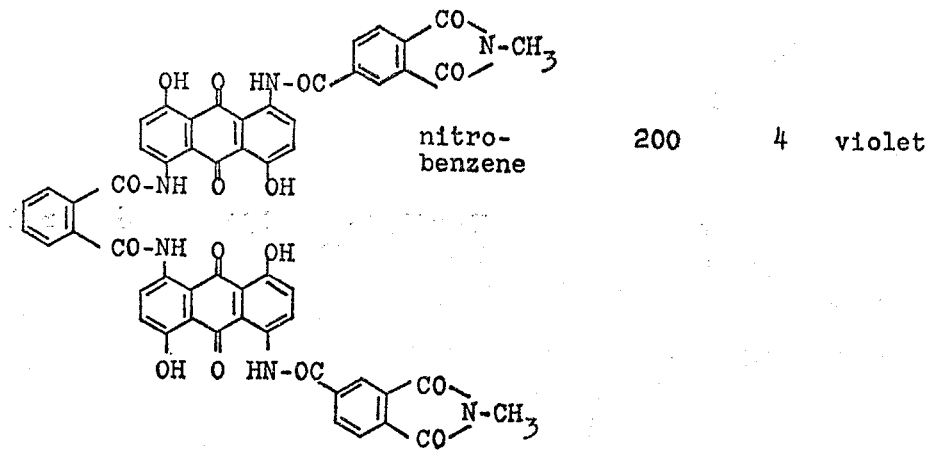 | nitrobenzene | 200 | 4 | violet |

| Example | Dye | Solvent | Reaction temperature, °C. | Reaction period, hours | Shade |
|---|---|---|---|---|---|
| 36 | | dichlorobenzene | 170 | 3 | greenish yellow |
| 37 | | trichlorobenzene | 190 | 4 | greenish yellow |
| 38 | | N-methylpyrrolidone | 190 | 4 | blue |
| 39 | | nitrobenzene | 160 | 2 | blue |
| 40 | | nitrobenzene | 200 | 6 | orange |
| 41 | | N-methylpyrrolidone | 190 | 6 | red |

| Example | Dye | Solvent | Reaction temperature, °C. | Reaction period, hours | Shade |
|---|---|---|---|---|---|
| 42 | 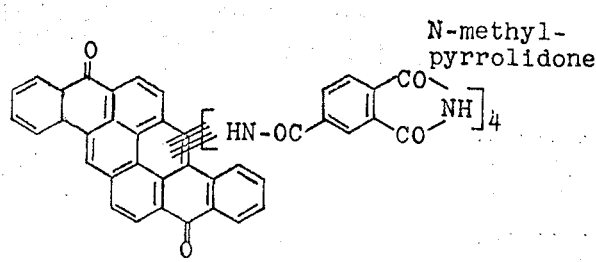 | N-methyl-pyrrolidone | 190 | 16 | maroon |
| 43 | 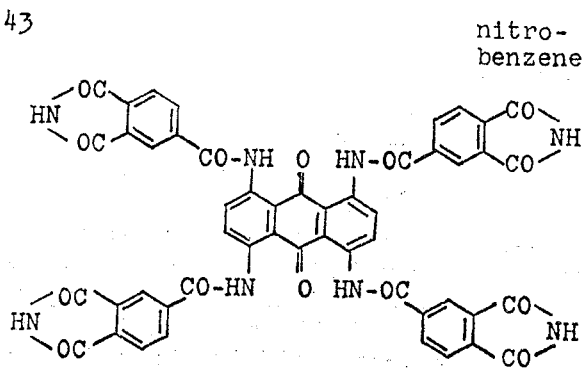 | nitrobenzene | 205 | 4 | violet |
| 44 | 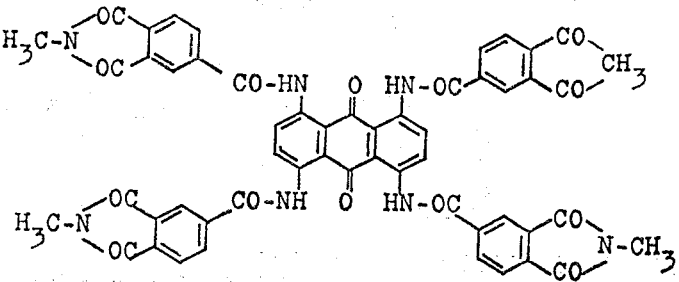 | nitrobenzene | 205 | 2 | violet |
| 45 | 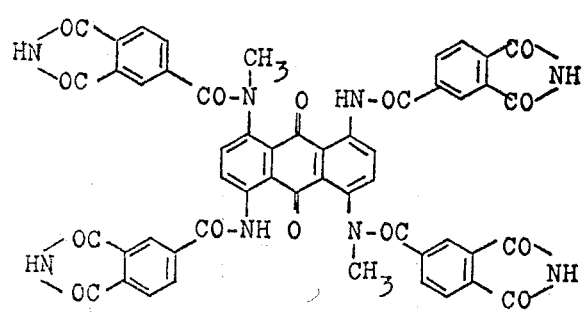 | nitrobenzene | 200 | 4 | violet |

EXAMPLE 46

150 parts of 1-amino-5-benzoylaminoanthraquinone is dissolved in 1,500 parts of anhydrous nitrobenzene. A solution of 54.2 parts of the acid chloride having the formula

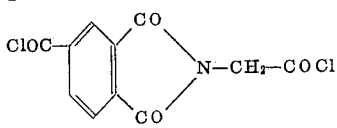

in 500 parts of anhydrous nitrobenzene is dripped in at 100 to 110° C., and the whole is heated for ten hours at 170 to 180° C., allowed to cool to 60° C. and then filtered with suction.

The residue is washed with nitrobenzene and with alcohol and dried. There is obtained 163 parts of a reddish yellow dye having the formula

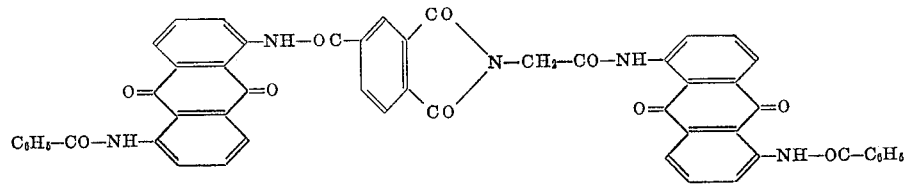

EXAMPLE 47

53 parts of a 4-amino-4'-nitroazobenzene is dissolved in 800 parts of anhydrous o-dichlorobenzene. To this 34.8 parts of the acid chloride having the formula

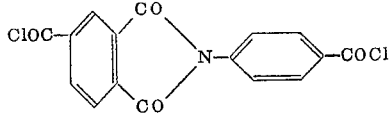

is added at 100° C. The whole is boiled for eight hours under reflux. The residue is filtered off with suction at 70° C., washed first with o-dichlorobenzene and then with benzene and finally dried at 100° C. 72 parts of a yellow dye having the formula

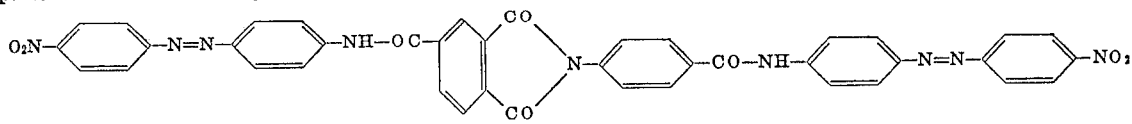

is obtained.

EXAMPLE 48

48 parts of 1-aminoanthraquinone is dissolved in 750 parts of anhydrous trichlorobenzene. To this 34.8 parts of the acid chloride having the formula

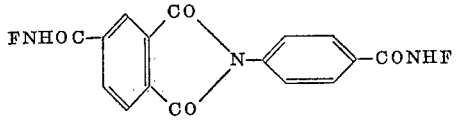

is added at 80 to 90° C., and the whole is boiled for four hours under reflux and then filtered with suction at 100° C. The residue is washed with warm trichlorobenzene and filtered, and the filtrate is boiled in 500 parts of dimethylformamide. After renewed filtration with suction, washing with ethanol and drying, 66 parts of a yellow dye having the formula is obtained.

The following dyes are analogously obtained from the acid chloride used in this example and further color amines:

| Example | FNH$_2$ | Temperature, °C. | Solvent | Period, hours | Shade |
|---|---|---|---|---|---|
| 49 | (1-amino-5-benzoylaminoanthraquinone structure) | 200 | Nitrobenzene | 6 | Reddish yellow. |
| 50 | (1-amino-8-benzoylaminoanthraquinone structure) | 200 | Naphthalene | 6 | Red. |

TABLE—Continued

| Example | FNH₂ | Temperature, °C. | Solvent | Period, hours | Shade |
|---|---|---|---|---|---|
| 51 | | 210 | Trichlorobenzene | 4 | Reddish yellow. |
| 52 | | 180 | ___do___ | 6 | Orange. |
| 53 | | 175 | Dichlorobenzene | 8 | Do. |
| 54 | | 200 | Nitrobenzene | 20 | Violet. |
| 55 | | 200 | Naphthalene | 8 | Scarlet. |
| 56 | | 200 | Nitrobenzene | 6 | Yellow. |
| 57 | | 250 | Diphthenyl oxide | 166 | Greenish yellow. |

EXAMPLE 58

49 parts of 1-aminoanthraquinone is dissolved in 1,200 parts of anhydrous nitrobenzene. To this 44.5 parts of the acid chloride having the formula

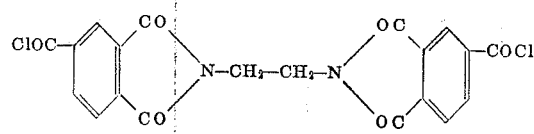

is added at 70 to 80° C., and the whole is boiled for twelve hours at 200 to 210° C. The reaction mixture is filtered with suction at 100° C. and the filtrate is extracted with dimethylformamide until the extractant runs away colorless. After washing with alcohol and drying, 72 parts of a yellow dye having the formula

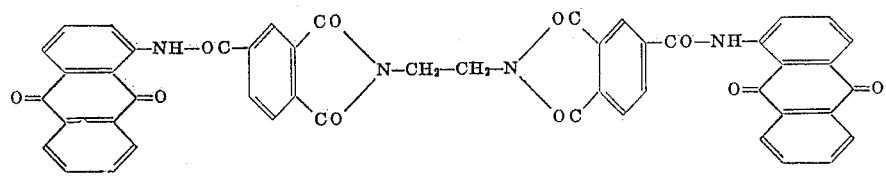

is obtained.

EXAMPLE 59

75 parts of 1-amino-5-benzoylaminoanthraquinone is dissolved in 1,400 parts of anhydrous nitrobenzene and stirred at 90° C. Then 50.1 parts of the acid chloride having the formula

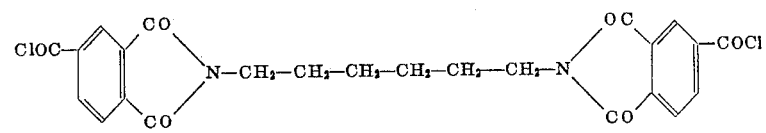

is added. The whole is boiled for eight hours and then cooled to 80° C. The residue is filtered with suction and washed with warm dimethylformamide until the latter runs away colorless. 102 parts of a reddish yellow dye having the formula

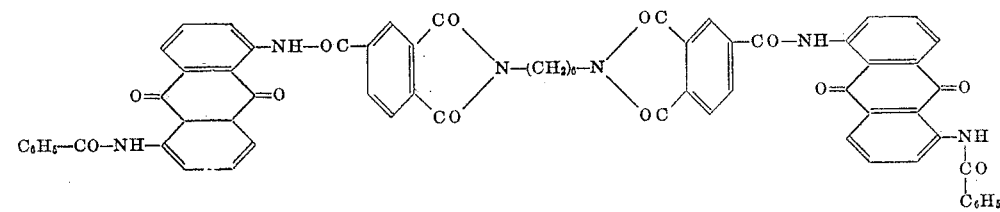

is obtained.

EXAMPLE 60

54 parts of 4-amino-1,9-anthrapyrimidine is dissolved in 1,800 parts of anhydrous nitrobenzene. 49.3 parts of the acid chloride having the formula

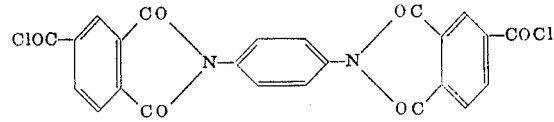

is added, and the whole is boiled under reflux for six hours. The pigment is filtered off with suction at 120° C. and extracted with dimethylformamide until the extractant runs away colorless. There is obtained 76 parts of a yellow dye having the formula

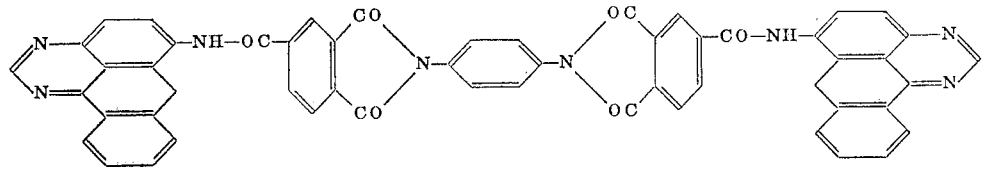

When using the color amines listed in the table below, corresponding dyes are obtained from the same acid chloride.

| Example | FNH₂ | Temperature, ° C. | Solvent | Period, hours | Shade |
|---|---|---|---|---|---|
| 61 | H₂N—⟨ ⟩—N=N—⟨HO, CH₃⟩ | 175 | Dichlorobenzene | 10 | Yellow. |
| 62 | (anthraquinone-NH₂) | 210 | Trichlorobenzene | 4 | Do. |
| 63 | (anthraquinone-NH₂, C₆H₅—CO—NH) | 210 | Nitrobenzene | 8 | Reddish yellow. |

| Example | FNH₂ | Temperature, °C. | Solvent | Period, hours | Shade |
|---|---|---|---|---|---|
| 64 | | 210 | Nitrobenzene | 10 | Reddish yellow. |
| 65 | | 210 | ----do---- | 8 | Do. |
| 66 | | 210 | ----do---- | 8 | Red. |
| 67 | | 210 | ----do---- | 8 | Violet. |

EXAMPLE 68

75 parts of 1-amino-5-benzoylaminoanthraquinone is dissolved in 2,000 parts of anhydrous nitrobenzene. 58.3 parts of the acid chloride having the formula

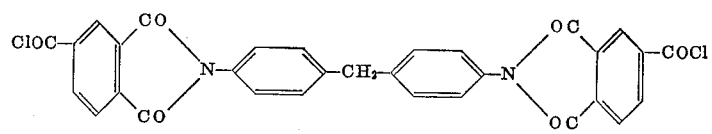

is added to this solution at 100° C. The whole is boiled for eight hours, 5 parts of pyridine is added, and boiling is continued for another eight hours. The reaction mixture is filtered with suction at 110° C. and extracted with dimethylformamide until the extractant runs away colorless. 119 parts of a reddish yellow dye having the formula

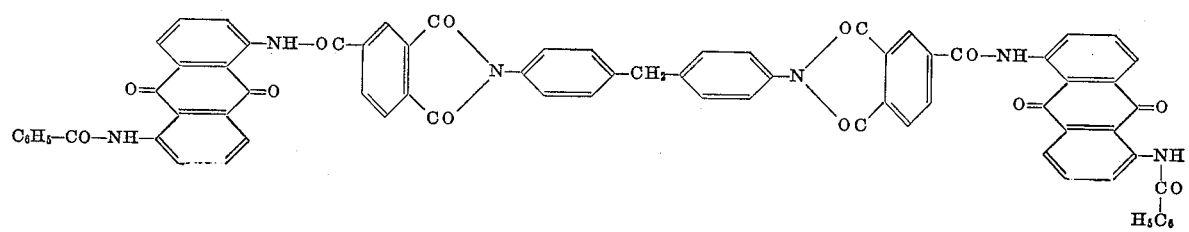

is obtained.

I claim:
1. A dye of the formula

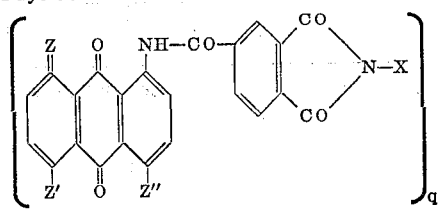

wherein:

X represents a member selected from the group consisting of hydrogen, methyl, phenyl, bromophenyl, chlorophenyl, nitrophenyl,

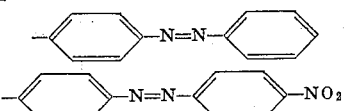

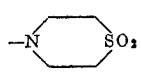

and

$q$ represents one of the numbers 1 or 2 with the proviso that when $q$ represents the number 1, one of the Z radicals represents a member selected from the group consisting of hydrogen,

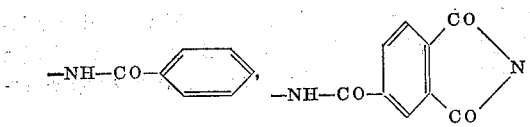

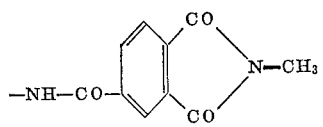

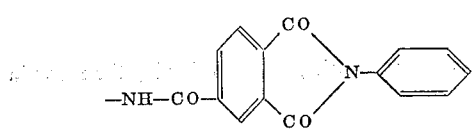

and

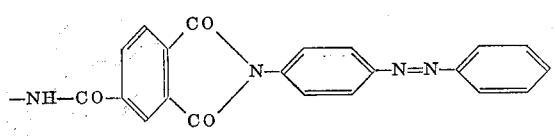

and that when $q$ represents the number 2, two Z radicals in the same position taken together represent the divalent radical

the remaining Z radicals each representing a member selected from the group consisting of hydrogen and hydroxy.

2. The dye having the formula

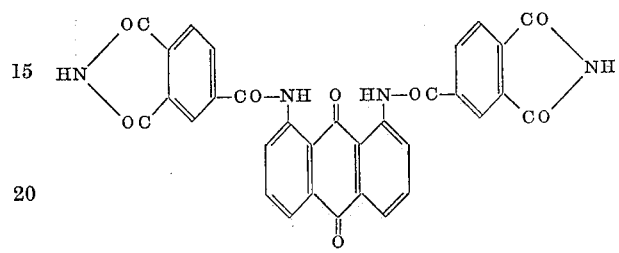

3. The dye having the formula

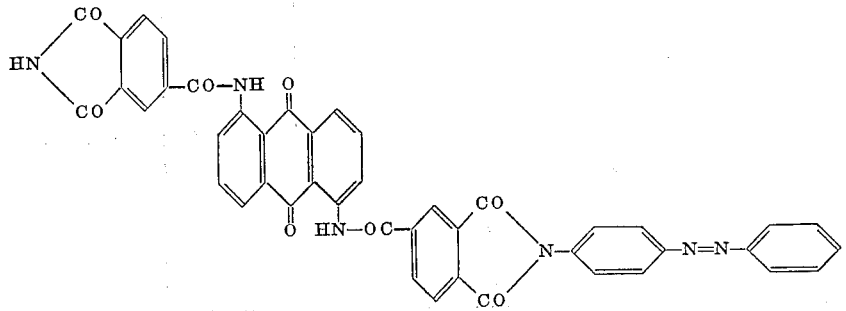

4. The dye having the formula

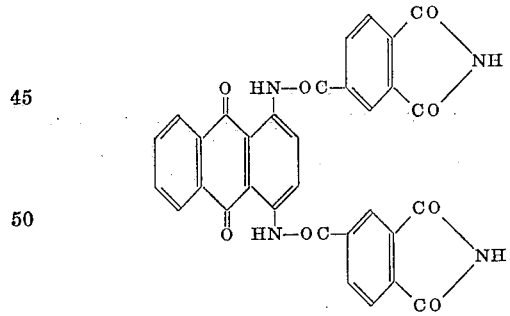

5. The dye having the formula

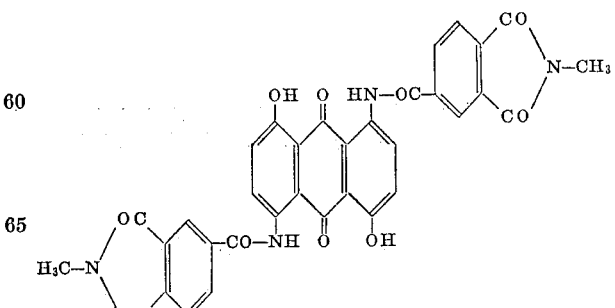

References Cited
UNITED STATES PATENTS
2,159,542  5/1939  Apotheker et al. ___ 260—203 X FLOYD D. HIGEL, *Primary Examiner.*

UNITED STATES PATENT OFFICE

CERTIFICATE OF CORRECTION

Patent No. 3,356,672 December 5, 1967

Ernst Schefczik

It is certified that error appears in the above identified patent and that said Letters Patent are hereby corrected as shown below:

Column 4, line 66, "reach" should read -- reacted --.
Column 9, line 49, "spin-drying" should read -- spin-dyeing --.
Columns 29 and 30, in the table, fourth column, line 7 thereof, "Diphthenyl" should read -- Diphenyl --.

Signed and sealed this 25th day of November 1969.

(SEAL)
Attest:

Edward M. Fletcher, Jr.
Attesting Officer

WILLIAM E. SCHUYLER, JR.
Commissioner of Patents